United States Patent
Steinwandel et al.

(10) Patent No.: US 9,625,145 B2
(45) Date of Patent: Apr. 18, 2017

(54) HIGH FREQUENCY-STABILIZED COMBUSTION IN AIRCRAFT GAS TURBINES

(71) Applicant: EADS Deutschland GmbH, Ottobrunn (DE)

(72) Inventors: Juergen Steinwandel, Uhldingen-Muehlhofen (DE); Johannes Stuhlberger, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 381 days.

(21) Appl. No.: 14/313,474

(22) Filed: Jun. 24, 2014

(65) Prior Publication Data

US 2015/0047363 A1    Feb. 19, 2015

(30) Foreign Application Priority Data

Jun. 27, 2013    (DE) .................. 10 2013 010 706

(51) Int. Cl.
| | |
|---|---|
| *F02C 1/00* | (2006.01) |
| *F23C 99/00* | (2006.01) |
| *F23N 5/00* | (2006.01) |
| *F23R 3/28* | (2006.01) |
| *F02C 7/00* | (2006.01) |

(52) U.S. Cl.
CPC .............. *F23C 99/001* (2013.01); *F02C 7/00* (2013.01); *F23N 5/006* (2013.01); *F23R 3/28* (2013.01); *F23N 2041/20* (2013.01); *F23R 2900/00009* (2013.01); *Y02T 50/677* (2013.01)

(58) Field of Classification Search
CPC .. F23D 2209/20; F23D 2207/00; F02C 7/264; F23C 99/001
See application file for complete search history.

(56) References Cited

U.S. PATENT DOCUMENTS

| | | | | |
|---|---|---|---|---|
| 4,359,683 | A | * 11/1982 | Chivers | ................... G01S 13/32 |
| | | | | 324/644 |
| 5,370,525 | A | 12/1994 | Gordon | |
| 5,442,907 | A | * 8/1995 | Asquith | ................... F02C 7/262 |
| | | | | 60/39.091 |
| 5,617,717 | A | 4/1997 | Asquith et al. | |
| 5,673,554 | A | * 10/1997 | DeFreitas | ............. F02P 23/045 |
| | | | | 102/200 |

(Continued)

FOREIGN PATENT DOCUMENTS

| | | |
|---|---|---|
| EP | 1 225 392 A2 | 7/2002 |
| EP | 2 107 305 A1 | 10/2009 |

(Continued)

OTHER PUBLICATIONS

German Office Action dated Feb. 17, 2014 (five (5) pages).
European Search Report dated Nov. 7, 2014 with partial English translation (nine pages).

*Primary Examiner* — Gerald L Sung
(74) *Attorney, Agent, or Firm* — Crowell & Moring LLP

(57) ABSTRACT

A gas turbine includes a combustion chamber and a microwave source to produce microwave radiation. The gas turbine is arranged to guide the microwave radiation into a cavity of the combustion chamber. Due to the microwave radiation, in the cavity of the combustion chamber, combustion in the cavity may be supported and thus lean operation of the gas turbine is made possible.

12 Claims, 5 Drawing Sheets

(56) References Cited

U.S. PATENT DOCUMENTS

| | | | |
|---|---|---|---|
| 5,845,480 A | 12/1998 | DeFreitas et al. | |
| 2009/0229581 A1* | 9/2009 | Ikeda | B01D 53/32 123/536 |
| 2010/0186368 A1* | 7/2010 | Ikeda | F02C 7/264 60/39.821 |
| 2011/0225948 A1* | 9/2011 | Valeev | F23C 99/001 60/39.821 |
| 2013/0291552 A1* | 11/2013 | Smith | F23N 5/16 60/779 |

FOREIGN PATENT DOCUMENTS

| | | |
|---|---|---|
| EP | 2 180 166 A1 | 4/2010 |
| EP | 2 366 951 A2 | 9/2011 |
| WO | WO 2012/103112 A2 | 8/2012 |
| WO | WO 2012/145836 A1 | 11/2012 |

\* cited by examiner

HIGH FREQUENCY-STABILIZED COMBUSTION IN AIRCRAFT GAS TURBINES

CROSS-REFERENCE TO RELATED APPLICATIONS

The present application claims priority under 35 U.S.C. §119 to German application number 10 2013 010 706.7, filed Jun. 27, 2013, the entire disclosure of which is herein expressly incorporated by reference.

BACKGROUND OF THE INVENTION

Exemplary embodiments of the invention relate to a gas turbine with a microwave source, an aircraft with a gas turbine, use of a microwave source to produce microwave radiation for a drive device, an electronic control for a gas turbine, and a method for controlling a gas turbine.

One requirement for gas turbines, especially aircraft gas turbines, is fuel efficient and low emissions operation. One possibility for this is operating the gas turbine with the highest possible excess air, i.e. lean operation.

One potential way to have lean operation is staged combustion. In staged combustion, a pilot flame with subsequent injection of the primary fuel quantity may be used to attain better homogenization, and, as a result of the intermediary combustion species, from the pilot flame the mixture may be rendered leaner. The pilot flame may be a kerosene flame, a hydrogen flame, or even a plasma-supported flame. Providing staged combustion may necessitate an extended combustion chamber.

SUMMARY OF THE INVENTION

Exemplary embodiments of the invention are directed to reducing fuel consumption of gas turbines.

In the following, operation with a large amount of excess air in the fuel-air mixture is also called lean operation. In the following the fuel-air ratio at which the combustion in the combustion chamber extinguishes without the introduction of microwaves or other measures is called the lean extinction limit.

A gas turbine is disclosed having a cavity for receiving and burning a fuel-air mixture. In addition, the gas turbine has a microwave source for producing microwave radiation, wherein the gas turbine is embodied to guide the microwave radiation into the cavity of the combustion chamber to support the combustion of the fuel-air mixture in the combustion chamber.

The combustion chamber may be, for example, an annular combustion chamber that extends annularly about the engine. Furthermore, the combustion chamber may be embodied as a can-type combustion chamber or as a can-annular combustion chamber, wherein a plurality of combustion chambers may be provided in the engine.

In the following, the term "microwave source" may also designate a high-frequency source for producing electromagnetic radiation. The microwave source may be e.g. a magnetron, a klystron tube, a Gunn diode, or an IMPATT diode. For instance, standard components for producing microwaves may be used for microwave sources. A magnetron may produce e.g. microwaves in the range of 0.9 to 25 GHz.

The microwave source may be disposed inside or outside of the combustion chamber. Furthermore, the microwave source may be disposed outside of the gas turbine, wherein the produced microwave radiation is guided to the combustion chamber of the gas turbine.

Introducing the microwave radiation into the cavity of the combustion chamber makes it possible to maintain lean operation. In other words, combustion in the combustion chamber, wherein the air portion in the fuel-air mixture is high, is made possible.

The microwave radiation introduced may cause coupling of ions, electrons, and/or neutral combustion fragments, e.g. OH, CH, CH2. This can make it possible to maintain a combustion reaction at a lean extinction limit.

Energy is supplied to the ions, electrons, and/or combustion fragments by the microwave radiation introduced, and this activates the fuel. The molecules absorb the energy and are activated, which supports and/or accelerates combustion. For instance, the molecules are activated using rotation energy, are caused to rotate and/or vibrate, so that the combustion reaction is enabled at the lean extinction limit.

In accordance with one embodiment of the invention, the microwave source is arranged outside of the combustion chamber.

By arranging the microwave source outside of the combustion chamber, the microwave source is not subjected to the high temperature in the combustion chamber. This makes it possible, for example, to use a standard component for the microwave source.

In accordance with another embodiment of the invention, the combustion chamber has a microwave-permeable window that is embodied to let the microwave radiation into the cavity of the combustion chamber.

The microwave-permeable window comprises for instance ceramics, quartz, Al2O3, sapphire, or a combination of these materials.

Providing a microwave-permeable window permits the microwave source to be attached outside of the combustion chamber and/or microwave radiation to be introduced into the cavity of the combustion chamber. For instance, the combustion chamber has a plurality of microwave-permeable windows that are arranged on the combustion chamber annularly about a rotational axis of the gas turbine.

In accordance with another embodiment of the invention, the gas turbine has a horn antenna for radiating the microwave radiation into the cavity of the combustion chamber.

The horn antenna is, for example, attached to the microwave source or connected to the microwave source. Moreover, the horn antenna may be disposed outside of the combustion chamber on a microwave-permeable window so that the horn antenna can radiate the microwave radiation into the cavity of the combustion chamber.

In accordance with another embodiment of the invention, the gas turbine has a waveguide for guiding the microwave radiation from the microwave source to or into the combustion chamber.

This makes it possible for the microwave source to be a certain distance from the combustion chamber. For instance, the microwave source may be 10-30 cm from the combustion chamber. The microwave radiation may be guided with the waveguide from the microwave source to the combustion chamber and radiated by the waveguide into the cavity of the combustion chamber. Moreover, the microwave radiation may be guided by a waveguide to a horn antenna and radiated by the horn antenna into the cavity of the combustion chamber.

In accordance with another embodiment of the invention, the gas turbine has a plurality of microwave sources that are arranged annularly about a rotationally symmetrical axis of the gas turbine.

The annular arrangement of the microwave sources may, for example, describe an arrangement of the microwave sources on a circular path. The center point of this circular path is defined e.g. by a rotational axis of a drive shaft of the gas turbine.

For instance, the gas turbine has 8 microwave sources arranged annularly, as seen from the rotational axis, outside of the combustion chamber.

In accordance with another embodiment of the invention, the microwave source is embodied to produce the microwave radiation with a frequency between 1 and 100 GHz.

In accordance with another embodiment of the invention, the microwave source is embodied to produce pulsed microwave radiation.

The pulsed microwave radiation is absorbed by the fuel molecules and/or the oxygen molecules. The energy supplied by the pulsed microwaves is absorbed and the molecules are caused to vibrate and/or rotate so that the combustion reaction is made possible at the lean extinction limit.

In accordance with another embodiment of the invention, the gas turbine is an aircraft gas turbine.

The invention furthermore relates to an aircraft having a gas turbine described above and in the following.

The aircraft may be an airplane or a helicopter, for instance.

The invention furthermore relates to the use of a microwave source to produce microwave radiation, wherein the microwave radiation is guided into a cavity of a combustion chamber for a drive device of an aircraft.

The drive device is, for example, a gas turbine, a motor for driving a propeller, or a turboprop mechanism.

The invention furthermore relates to an electronic control for a gas turbine, wherein the gas turbine has a combustion chamber with a cavity for receiving and igniting a fuel-air mixture and has a microwave source for producing microwave radiation. Furthermore, the cavity is embodied to receive the fuel-air mixture and the microwave radiation and the electronic control is embodied for regulating the microwave source. A suitable sensor system is provided for this to make it possible for the control to evaluate when the microwave source should be activated.

For instance, the electronic control is designed to determine when the gas turbine should and/or may be operated in a lean operation. In the lean operation the electronic control may for instance activate the microwave source so that lean operation of the gas turbine is provided.

For instance, the electronic control is designed to determine the flying altitude so that lean operation of the gas turbine may be activated at a certain flying altitude. The electronic control may, for example, also determine the current operating mode of the gas turbine, for example whether the turbine must operate at full capacity for starting the aircraft or whether the turbine may be operated in a saving mode or in lean operation. As a result the electronic control may activate the microwave source for the lean operation.

Thus flexible and/or optimal operation of the gas turbine is made possible using the electronic control. The operation of the gas turbine may accordingly be adapted to the current requirement for performance and/or fuel consumption.

The invention furthermore relates to a method for controlling a gas turbine wherein the method has the steps of determining an oxygen content of exhaust gases that are emitted by the gas turbine and regulating a microwave source as a function of the determined oxygen content of the exhaust gases. The method furthermore has the step of introducing the microwave radiation from the microwave source into a cavity of a combustion chamber of the gas turbine.

For instance, it may be determined whether the oxygen content of the exhaust gases exceeds a certain limit. In this case for example the output of the microwave source may be increased.

Thus automatic regulation of the microwave source is made possible. Measurement of the oxygen content in the exhaust gases may also make possible fine adjustment of the gas turbine.

The described exemplary embodiments also relate to a gas turbine, an aircraft having a gas turbine, use of a microwave source for a drive device of an aircraft, an electronic control for a gas turbine, and a method for controlling a gas turbine, regardless of whether individual embodiments are described exclusively with respect to a gas turbine.

Additional features, advantages, and potential applications of the invention result from the following description of the exemplary embodiments and drawings. All described and/or illustrated depictions of features constitute subject matter of the invention, alone or in any desired combination, even regardless of their composition in the individual claims or how they are referenced.

BRIEF DESCRIPTION OF THE DRAWING FIGURES

The drawings are diagrammatic and not to scale. In the following description, identical reference numbers used in different drawings indicate identical or similar elements. Identical or similar elements may also have different reference numbers, however.

DETAILED DESCRIPTION OF EXEMPLARY EMBODIMENTS

In a combustion chamber of a gas engine, a flame that forms upstream of the entrance of air and fuel causes pre-evaporation of liquid fuel. This pre-evaporation of the liquid fuel may result in partial pre-mixing and/or partial homogeneity of a fuel-air mixture. Thus, the maximum occurring temperature of the combustion chamber may be lower than the temperature with diffusion flames, which may result in a reduction in the nitrogen oxides. However, when it is rendered very lean, i.e. when there is a high proportion of air in the fuel-air mixture, the flame may extinguish.

Reduced temperature of the combustion chamber may lead to a reduction in the nitrogen oxides. In particular Zeldovich nitrogen oxides and prompt nitrogen oxides may be reduced. Fuel nitrogen oxides may not be affected. On the other hand, portions of non-combusted hydrocarbons and carbon oxides increase, which may limit the operating range of the fuel-air ratio. This may derive from poor reaction kinetics due to reduced temperature, since the reaction speed is proportional to the exponential function of the inverse temperature. Consequently, when there is a large amount of excess air and the flame temperature is low, the reaction speed may be reduced and the combustion may therefore extinguish.

Figure 1:
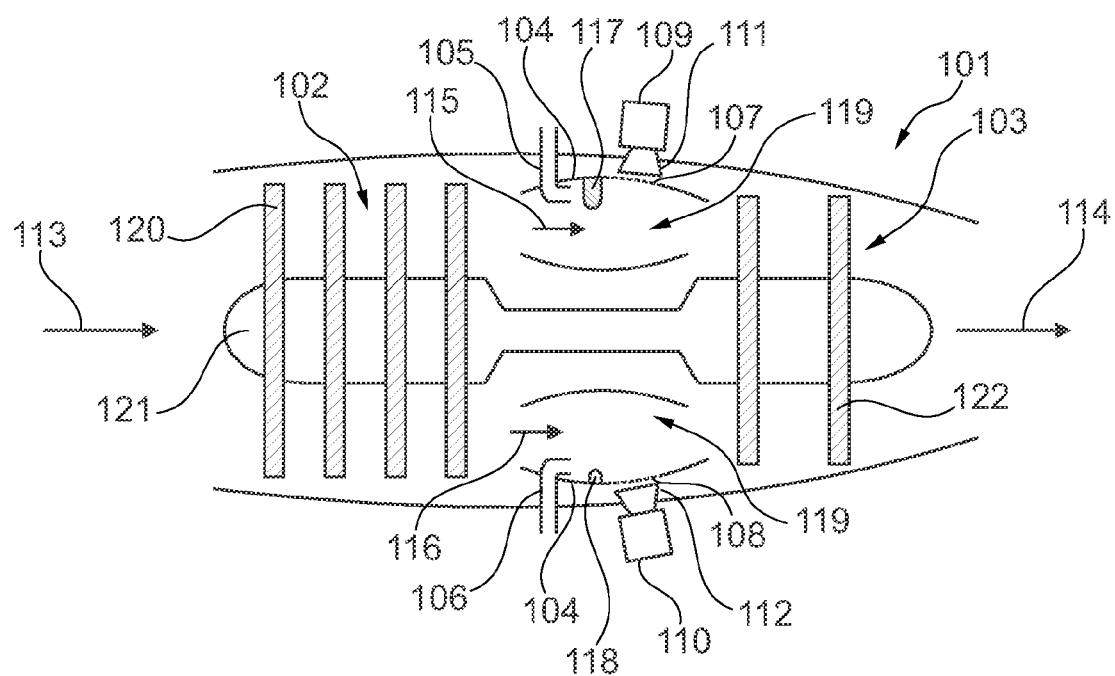
FIG. 1 depicts a gas turbine in accordance with one exemplary embodiment of the invention.

FIG. 1 depicts a cross-section of a gas turbine 101 in accordance with one exemplary embodiment of the invention. The gas turbine has a compressor 102 that is embodied to compress the incoming air and then to guide it into the combustion chamber 104. The compressor 102 includes a plurality of blades 120 with compressor vanes, wherein the blades 120 are attached axially to a drive shaft 121. Moreover, the gas turbine has a combustion chamber 104 that is attached, for example, annularly behind the compressor 102. Disposed in the combustion chamber 104 is the cavity of the combustion chamber 119, in which the combustion of the fuel-air mixture takes place. The combustion chamber 104 furthermore has a first nozzle 105 and a second nozzle 106 for supplying fuel, for instance kerosene. For igniting the fuel-air mixture in the combustion chamber 104, the combustion chamber 104 furthermore has a first igniter 117 and a second igniter 118. For admitting microwave radiation into the combustion chamber 104, the combustion chamber furthermore has a first microwave-permeable window 107 and a second microwave-permeable window 108. Outside of the combustion chamber 104 is a first microwave source 109 with a horn antenna 111 and a second microwave source 110 that guides the microwave radiation to the combustion chamber with a waveguide 112. The horn antenna 111 and the waveguide 112 are arranged at the first and second microwave-permeable windows 107 and 108, respectively. The gas turbine may have additional nozzles, igniters, microwave-permeable windows, and microwave sources that are arranged about the drive shaft 121. Disposed behind the combustion chamber 104 is the turbine 103, which has blades 122 that are connected axially to the drive shaft 121.

As the arrow 113 depicts, air is drawn in due to the rotation of the blades 120 of the compressor 102. The arrows 115 and 116 depict the air that is compressed by the compressor 102 and guided into the combustion chamber 104. In the cavity 119 of the combustion chamber 104 fuel is supplied to the compressed air through the nozzles 105 and 106. The resultant fuel-air mixture is ignited by the igniters 117 and 118. To support the combustion, the microwave sources 109 and 110 produce microwave radiation, which is radiated by the horn antenna 111 or by the waveguide 112 through the windows 107 and 108 into the cavity. The gases from the combustion of the fuel-air mixture are then guided to the turbine 103 for driving the gas turbine and then out of the gas turbine 101, as the arrow 114 depicts.

Figure 2:
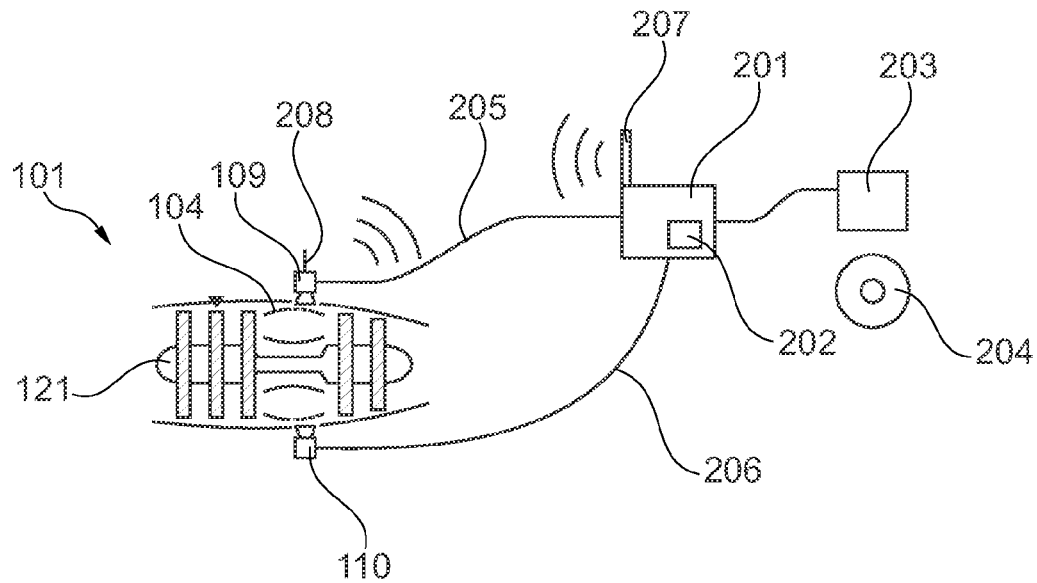
FIG. 2 depicts an arrangement having a gas turbine and a control device in accordance with another exemplary embodiment of the invention.

FIG. 2 depicts a gas turbine 101 with a combustion chamber 104, wherein a first microwave source 109 and a second microwave source 110 are positioned outside of the combustion chamber.

Also depicted is a control device 201 that has a processor 202. The control device is connected with a first line 205 to the first microwave source 109 and with a second line 206 to the second microwave source 110. In addition, the control device has an antenna 207 and the first microwave source has a second antenna 208, so that the first microwave source 109 and the control device 201 may exchange data wirelessly. The control device 201 is embodied for controlling the microwave sources 109 and 110 via the lines 205 and 206 and via the wireless connection with the antennas 207 and 208. Moreover, the control device 201 is connected to a reading device 203 for a computer-readable medium 204, for instance a CD.

Figure 3:
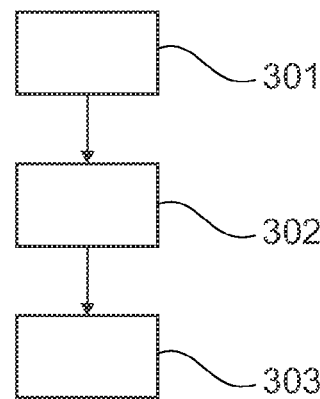
FIG. 3 depicts a method in accordance with another exemplary embodiment of the invention.

FIG. 3 is a flowchart for a method in accordance with one exemplary embodiment of the invention. The method has a step 301 for determining a physical parameter, for instance the oxygen content of exhaust gases that are emitted by the gas turbine, the flying altitude, or the efficiency of the gas turbine, and a step 302 for regulating a microwave source as a function of the determined oxygen content of the exhaust gases. The method furthermore has a step of 303 for introducing the microwave radiation into a cavity of a combustion chamber of the gas turbine.

Figure 4:
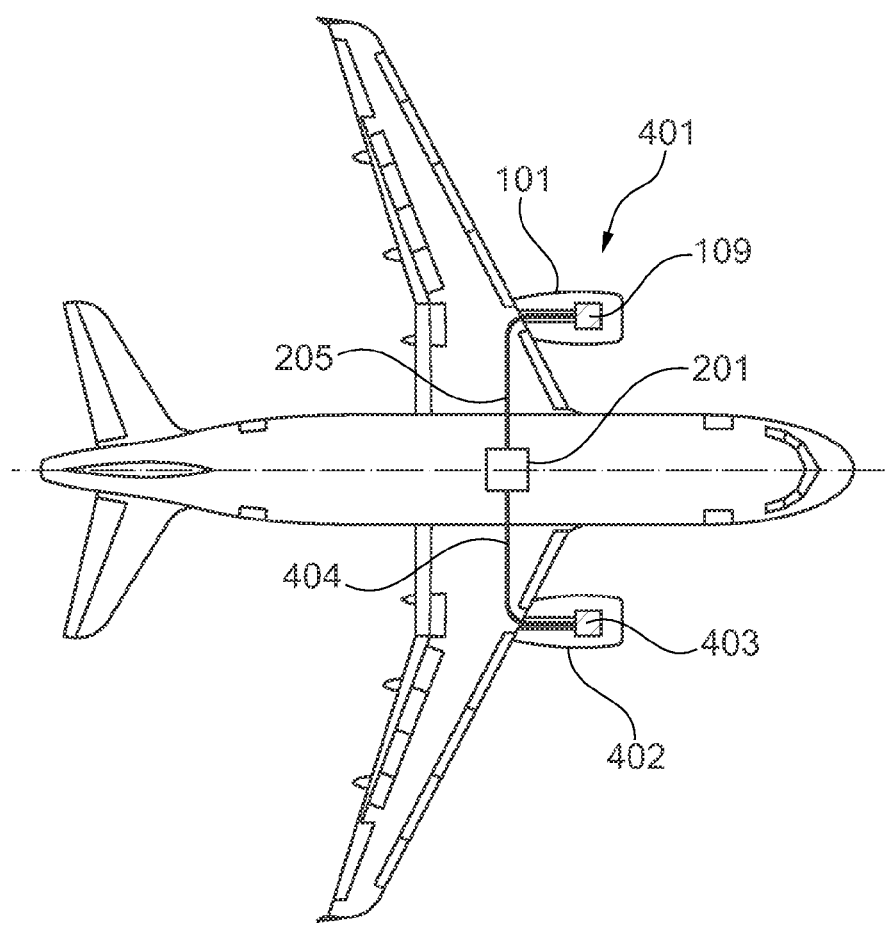
FIG. 4 depicts an aircraft in accordance with another exemplary embodiment of the invention.

FIG. 4 depicts an aircraft 401 in accordance with one exemplary embodiment of the invention. The aircraft 401 has a first turbine 101 and a second turbine 402. To support the combustion in the combustion chamber 104, the first turbine has a microwave source 109 and the second turbine 402 has a microwave source 403. In addition, the aircraft contains a control device 201 for controlling the microwave sources 109 and 402. For controlling the microwave sources 109 and 402, the control device 201 is connected to the microwave source 109 via a first line 205 and to the microwave source 403 via a second line 404.

Figure 5:
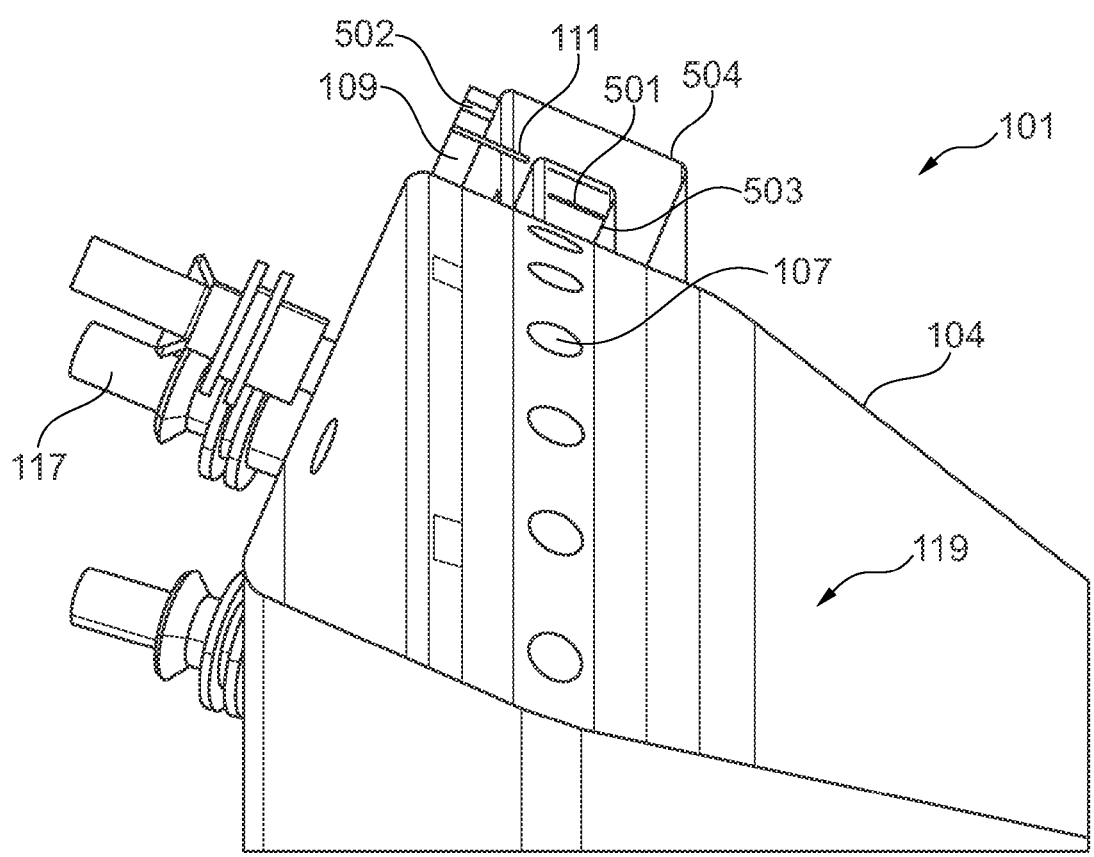
FIG. 5 depicts a part of a gas turbine in accordance with another exemplary embodiment of the invention.
Figure 6:
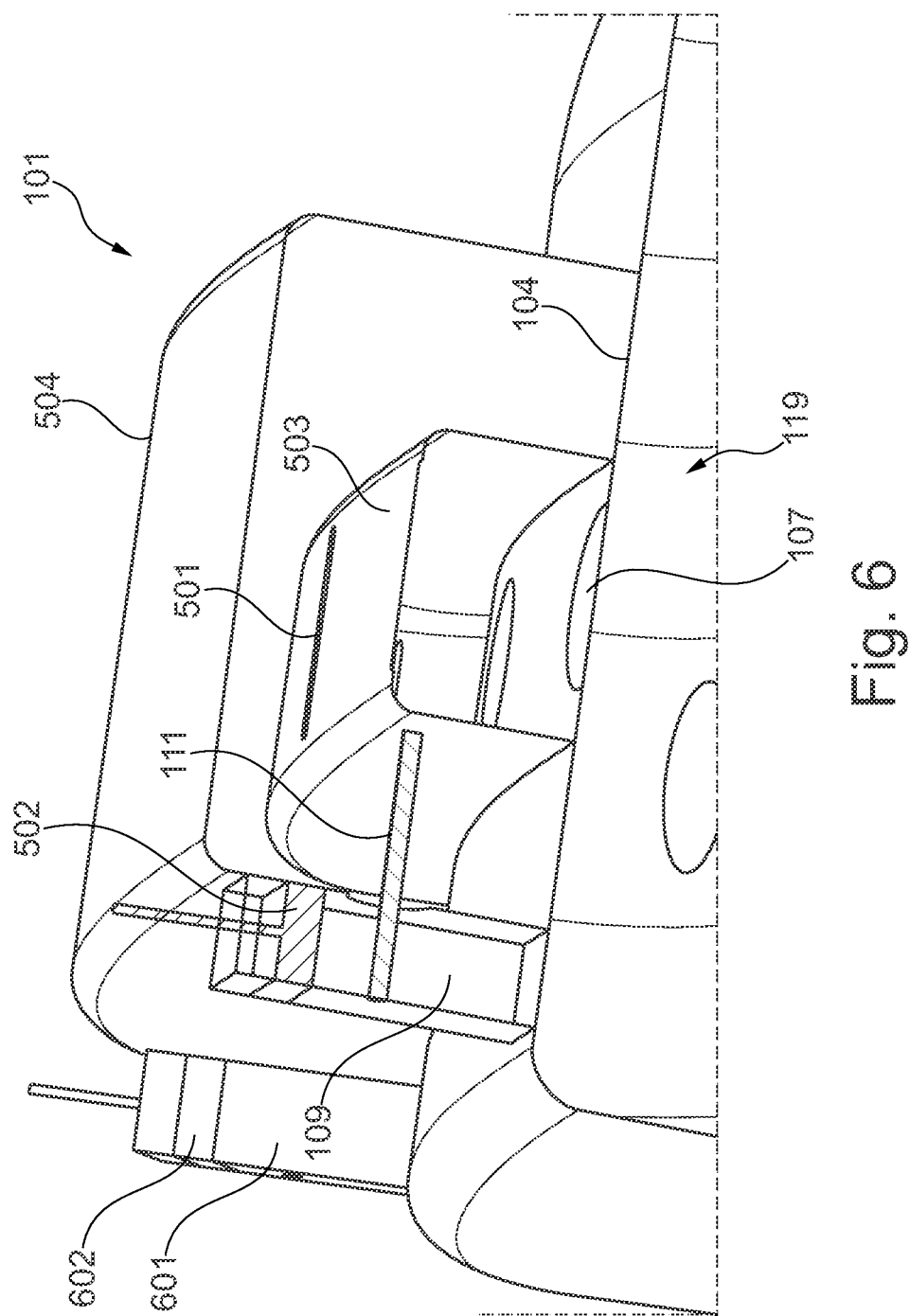
FIG. 6 depicts a part of a gas turbine in accordance with another exemplary embodiment of the invention.
Figure 7:
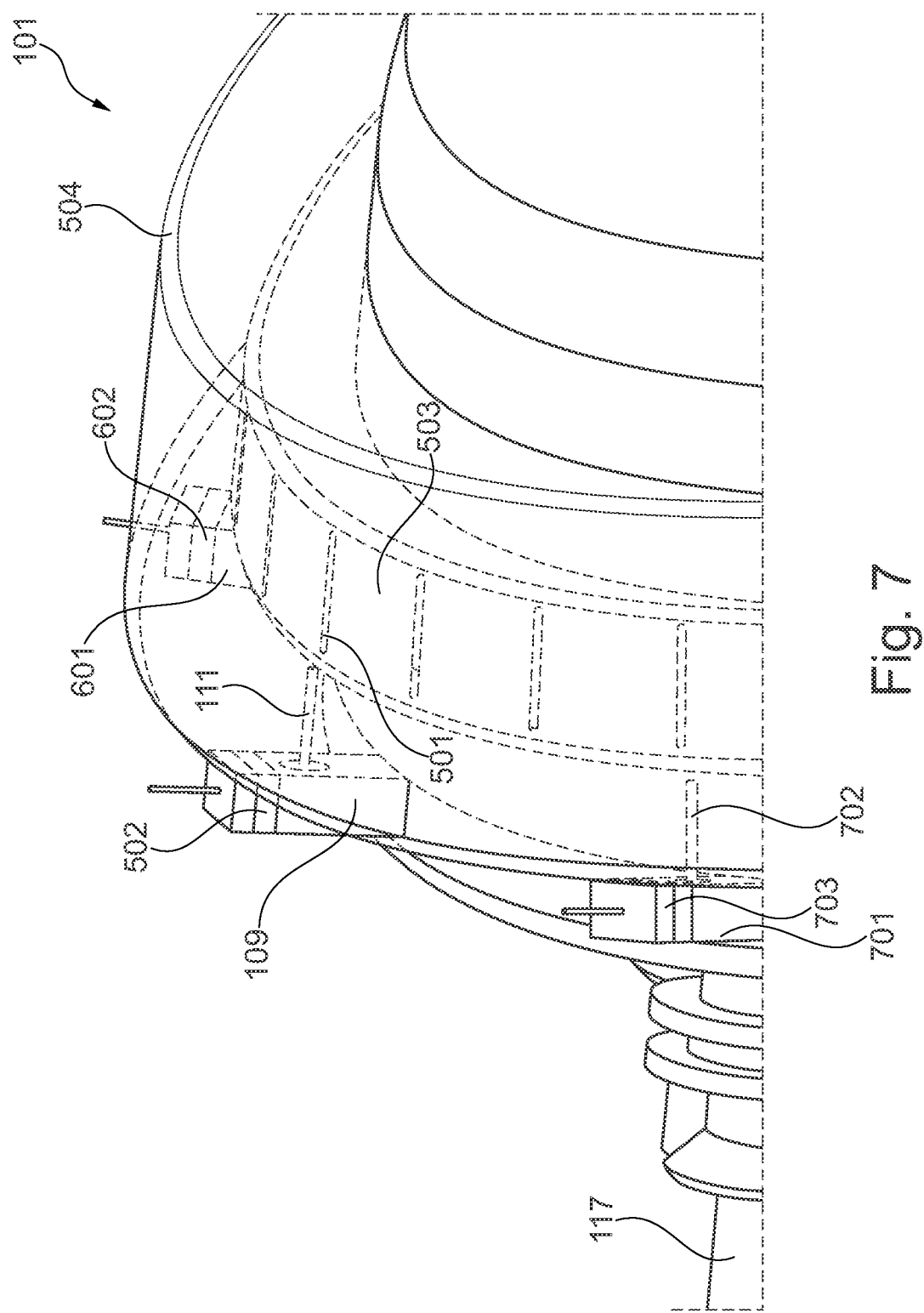
FIG. 7 depicts a part of a gas turbine in accordance with another exemplary embodiment of the invention.

FIGS. 5, 6 and 7 depict different segments of a part of a gas turbine 101 in accordance with another exemplary embodiment of the invention.

FIG. 5 depicts a combustion chamber 104 with a cavity 119. The combustion chamber 104 is arranged annularly about a rotational axis and a drive shaft that are disposed below the visible area of the drawing. In addition, igniters 117 are attached to the combustion chamber 104. A first microwave source 109 is attached to the combustion chamber 104 outside of the gas turbine and combustion chamber 104 as seen from the rotational axis.

The first microwave source 109 has a short-circuit switch 502. In addition, the first microwave source 109 is connected to an antenna 111 that projects into a first chamber 504. As seen from the rotational axis, the first chamber 504 is attached to the combustion chamber 104 outside of the combustion chamber 104. Disposed inside the first chamber 504 is a second chamber 503 that is attached to the combustion chamber 104. A plurality of microwave-permeable windows 107 are added to a limiting surface between the combustion chamber 104 and the second chamber 503. In addition, the second chamber has a plurality of slits 501 that are arranged opposing the microwave-permeable windows 107.

FIG. 6 depicts an enlarged segment of the gas turbine 101 in which the first chamber 504 and the second chamber 503 are shown. It may also be seen in FIG. 6 that a second microwave source 601 is arranged on the combustion chamber 104 on a circle about the rotational axis of the drive shaft. The second microwave source also has an ignition switch 602 and an antenna (not shown in this segment).

FIG. 7 depicts a segment of the gas turbine 101, wherein the first chamber 504 is depicted in a semi-transparent manner. The second chamber 503 is disposed inside the first chamber 504. In addition, added to the second chamber 503 are slits 501 that are arranged annularly about the axis of rotation of the drive shaft.

In addition, the first microwave source 109, the second microwave source 601, and a third microwave source 701 are shown and are arranged annularly about a rotational axis of the drive shaft. The third microwave source 701 also has an antenna 702 and an ignition switch 703.

It should also be noted that "including" or "having" does not exclude any other elements and "a" or "an" does not exclude more than one. In addition it should be noted that features that have been described referring to one of the above embodiments or exemplary embodiments may also be used in combination with other features of other embodiments or exemplary embodiments described above. Reference numbers in the claims shall not be construed as limitations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gas turbine, comprising:
 a combustion chamber with a cavity configured to receive and burn a fuel-air mixture, wherein the combustion chamber is an annular combustion chamber that extends annularly about a rotational axis of the gas turbine; and
 a microwave source configured to produce microwave radiation,
 wherein the gas turbine is configured to guide the microwave radiation into the cavity of the combustion chamber to support the combustion of the fuel-air mixture in the combustion chamber,
 wherein the gas turbine comprises an annular first chamber attached to the combustion chamber, so as to be disposed outside of the combustion chamber from a perspective of the rotational axis of the gas turbine, and extending annularly about the rotational axis of the gas turbine,
 wherein an annular second chamber is disposed inside the first chamber, and extending annularly about the rotational axis of the gas turbine,
 wherein a plurality of microwave-permeable windows is included in a limiting surface between the combustion chamber and the second chamber and are arranged annularly about the rotational axis of the gas turbine,
 wherein the second chamber has a plurality of slits that are arranged annularly about the rotational axis of the gas turbine and opposing the microwave-permeable windows, and
 wherein the microwave source is connected to an antenna that projects into the first chamber.

2. The gas turbine of claim 1, wherein the microwave source is arranged outside of the combustion chamber.

3. The gas turbine of claim 1, wherein at least one of the plurality of microwave-permeable windows is configured to pass the microwave radiation into the cavity of the combustion chamber.

4. The gas turbine of claim 1, further comprising:
 a horn antenna configured to radiate the microwave radiation into the cavity of the combustion chamber.

5. The gas turbine of claim 1, further comprising:
 a waveguide configured to guide the microwave radiation from the microwave source to the combustion chamber.

6. The gas turbine of claim 1, wherein the gas turbine has a plurality of microwave sources arranged annularly about the rotational axis of the gas turbine.

7. The gas turbine of claim 1, wherein the microwave source is configured to produce the microwave radiation with a frequency between 1 and 100 GHz.

8. The gas turbine of claim 1, wherein the microwave source is configured to produce a pulsed microwave radiation.

9. The gas turbine of claim 1, wherein the gas turbine is an aircraft gas turbine.

10. The gas turbine of claim 1, further comprising:
 an electronic control configured to regulate the microwave source.

11. An aircraft, comprising:
 a gas turbine, which comprises
 a combustion chamber with a cavity configured to receive and burn a fuel-air mixture, wherein the combustion chamber is an annular combustion chamber that extends annularly about a rotational axis of the gas turbine; and
 a microwave source configured to produce microwave radiation,
 wherein the gas turbine is configured to guide the microwave radiation into the cavity of the combustion chamber to support the combustion of the fuel-air mixture in the combustion chamber,
 wherein the gas turbine comprises an annular first chamber attached to the combustion chamber, so as to be disposed outside of the combustion chamber from a perspective of the rotational axis of the gas turbine, and extending annularly about the rotational axis of the gas turbine,
 wherein an annular second chamber is disposed inside the first chamber, and extending annularly about the rotational axis of the gas turbine,
 wherein a plurality of microwave-permeable windows is included in a limiting surface between the combustion chamber and the second chamber and are arranged annularly about the rotational axis of the gas turbine,
 wherein the second chamber has a plurality of slits that are arranged annularly about the rotational axis of the gas turbine and opposing the microwave-permeable windows, and
 wherein the microwave source is connected to an antenna that projects into the first chamber.

12. A method for controlling a gas turbine, the gas turbine comprising: a combustion chamber with a cavity configured to receive and burn a fuel-air mixture, wherein the combustion chamber is an annular combustion chamber that extends annularly about a rotational axis of the gas turbine; and a microwave source configured to produce microwave radiation, wherein the gas turbine is configured to guide the microwave radiation into the cavity of the combustion chamber to support the combustion of the fuel-air mixture in the combustion chamber, wherein the gas turbine comprises an annular first chamber attached to the combustion chamber, so as to be disposed outside of the combustion chamber from a perspective of the rotational axis of the gas turbine, and extending annularly about the rotational axis of the gas turbine, wherein an annular second chamber is disposed inside of the first chamber, and extending annularly about the rotational axis of the gas turbine, wherein a plurality of microwave-permeable windows is included in a limiting surface between the combustion chamber and the second chamber and are arranged annularly about the rotational axis of the gas turbine, wherein the second chamber has a plurality of slits that are arranged annularly about the rotational axis of the gas turbine and opposing the microwave permeable windows, and wherein the microwave source is connected to an antenna that projects into the first chamber, the method comprising the steps: determining an oxygen content of exhaust gases emitted by the gas turbine; regulating the microwave source to produce the microwave radiation as a function of the determined oxygen content of the exhaust gases; and introducing the microwave radiation from the microwave source into the cavity of the combustion chamber of the gas turbine.

* * * * *